(12) United States Patent
Tokumoto

(10) Patent No.: US 10,740,055 B2
(45) Date of Patent: Aug. 11, 2020

(54) PRINT SYSTEM, PRINT APPARATUS, AND STORAGE MEDIUM

(71) Applicant: CANON KABUSHIKI KAISHA, Tokyo (JP)

(72) Inventor: Hirokazu Tokumoto, Kashiwa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/444,583

(22) Filed: Jun. 18, 2019

(65) Prior Publication Data

US 2020/0012466 A1  Jan. 9, 2020

(30) Foreign Application Priority Data

Jul. 5, 2018  (JP) .................. 2018-128440

(51) Int. Cl.
*G06F 3/12* (2006.01)

(52) U.S. Cl.
CPC ............ *G06F 3/1274* (2013.01); *G06F 3/122* (2013.01); *G06F 3/1267* (2013.01); *G06F 3/1288* (2013.01)

(58) Field of Classification Search
CPC ...... G06F 3/1274; G06F 3/122; G06F 3/1267; G06F 3/1288
See application file for complete search history.

(56) References Cited

U.S. PATENT DOCUMENTS

| | | | |
|---|---|---|---|
| 2008/0184236 A1* | 7/2008 | Yamauchi | G06F 9/5011 718/100 |
| 2011/0063665 A1* | 3/2011 | Hirakawa | G06F 3/121 358/1.15 |
| 2014/0333960 A1* | 11/2014 | Fukasawa | G06K 15/1817 358/1.15 |

FOREIGN PATENT DOCUMENTS

| | | |
|---|---|---|
| JP | 2007-251279 A | 9/2007 |
| JP | 2014-148064 A | 8/2014 |

* cited by examiner

*Primary Examiner* — Moustapha Diaby
(74) *Attorney, Agent, or Firm* — Canon U.S.A., Inc. IP Division

(57) ABSTRACT

Each print apparatus performs control to execute deletion based on a reception date/time included in bibliographic information of print data and a set validity period, for print data stored in own apparatus, and to not execute deletion based on a reception date/time included in bibliographic information of print data and a set validity period, for print data stored in other print apparatus.

11 Claims, 14 Drawing Sheets

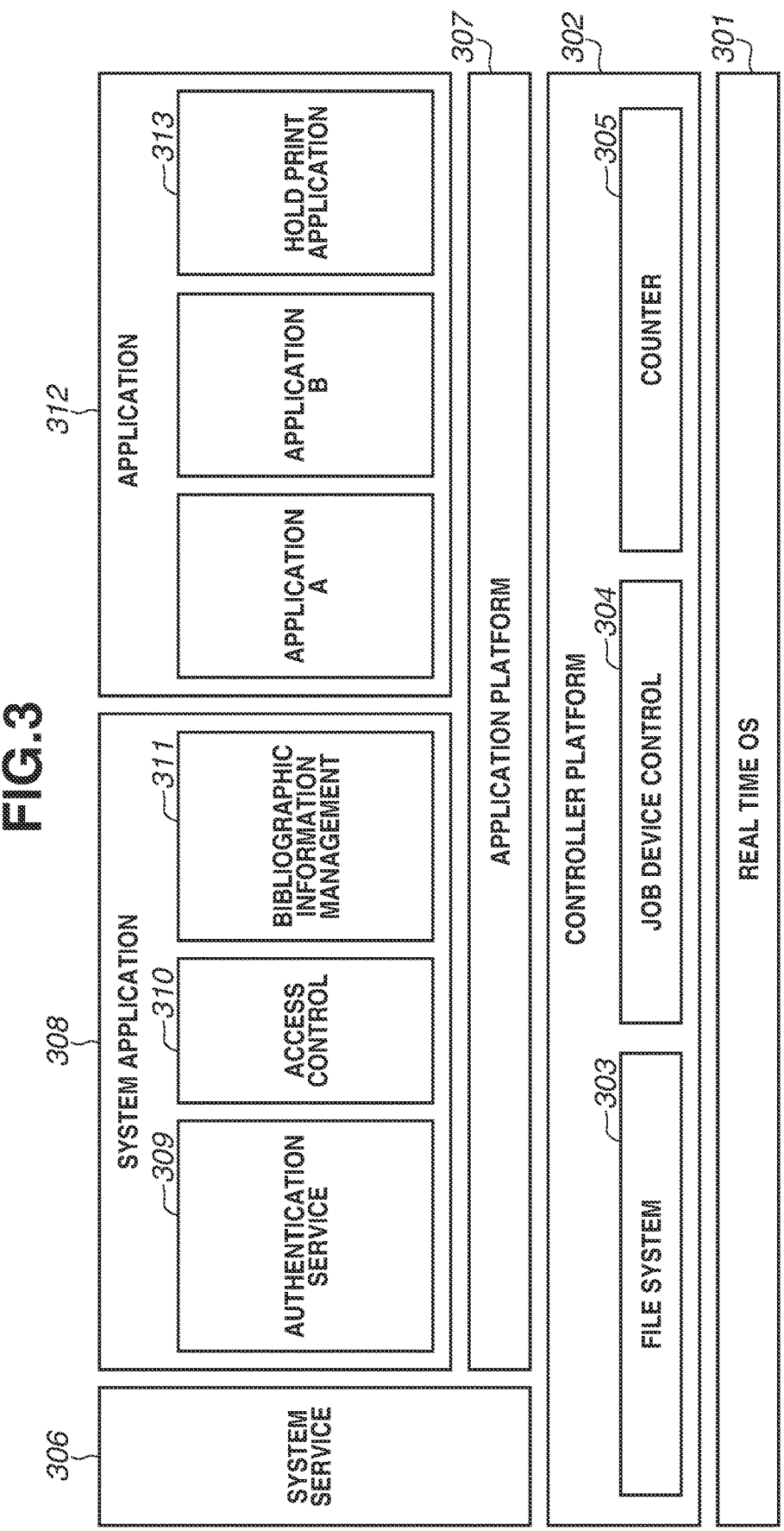

FIG.4

| | | STORAGE LOCATION | | | PRINT SETTING | | | | |
|---|---|---|---|---|---|---|---|---|---|
| USER NAME | RECEPTION DATE/TIME | IP ADDRESS | DIRECTORY PATH | JOB NAME | SHEET SIZE | N-IN-ONE PRINTING | PAGE COUNT | COPY COUNT | TWO-SIDED SETTING |
| | 2015.03.12 12:34 | localhost | /printdata/0015/xxx | index.html | A4 | 1 in 1 | 1 | 1 | ONE-SIDED |
| sato | 2015.03.11 8:30 | 192.168.0.1 | | MATERIAL FOR REVIEW.pdf | A4 | 2 in 1 | 7 | 1 | ONE-SIDED |
| | 2015.03.10 17:21 | 192.168.0.2 | | PROJECT MEETING.docx | A3 | 1 in 1 | 7 | 30 | ONE-SIDED |
| | 2015.03.10 11:34 | 192.168.0.3 | | BUDGET MANAGEMENT.xlsx | A4 | 1 in 1 | 6 | 3 | ONE-SIDED |
| yamada | 2015.03.12 12:34 | localhost | /printdata/2108/www | PHOTO.jpg | A5 | 1 in 1 | 1 | 1 | ONE-SIDED |

PRINT SYSTEM, PRINT APPARATUS, AND STORAGE MEDIUM

BACKGROUND

Field of the Disclosure

The present disclosure relates to a print system, a print apparatus, and a storage medium.

Description of the Related Art

A conventional multifunction peripheral immediately performs printing, upon receiving a print job from a terminal apparatus such as a personal computer (PC). In this case, there is a possibility of information leakage when someone views a printed sheet left behind or left unattended. To prevent leaving a printed sheet unattended, hold printing has been discussed in recent years (see Japanese Patent Application Laid-Open No. 2007-251279). In the hold printing, when a print job is received, print data is held in a nonvolatile storage area without being printed, and printing is performed later when a user provides a print instruction on an operation unit of a multifunction peripheral. In such a multifunction peripheral, in order to prevent the held print data from being left unattended without being printed, a validity period is set for the print data, and the held print data is deleted when the validity period expires.

In recent years, a hold remote print system has also been discussed (Japanese Patent Application Laid-Open No. 2014-148064). In this hold remote print system, a multifunction peripheral that has received print data can perform printing of this print data, and other multifunction peripheral can perform printing of this print data as well by acquiring this print data held in the multifunction peripheral. In this hold remote print system, each of a plurality of multifunction peripherals receives print data and holds the received data in the own nonvolatile storage area. Further, each of the plurality of multifunction peripherals registers bibliographic information for identifying the print data in a server. Other multifunction peripheral within the system can also refer to the bibliographic information registered in the server. In this way, at whichever multifunction peripheral the user provides a print instruction, the user can perform printing by acquiring the print data from the multifunction peripheral holding the print data.

In the above-described hold remote print system, however, control to be performed for a case where validity periods that vary among the multifunction peripherals are set is not discussed. Each of the multifunction peripherals may delete the print data based on the validity period set in each apparatus, and update the bibliographic information based on such deletion, but this can reduce the convenience of the user.

For example, in a case where one day is set as a validity period in a multifunction peripheral A and three hours is set as a validity period in a multifunction peripheral B, and a user transmits print data from a PC to the multifunction peripheral A so that the print data is held in the multifunction peripheral A. If three hours elapse in a state where neither of these multifunction peripherals receives a print instruction from the user, the validity period in the multifunction peripheral B expires, so that processing for deleting the print data and deletion of the target bibliographic information are performed. Afterward, even if the user attempts to perform printing at the multifunction peripheral A, printing cannot be performed because the target print data has been deleted.

SUMMARY

The present disclosure is directed to a print system in which print data stored in any one of print apparatuses can be printed from other one of the print apparatuses, a validity period of print data is set in each of the print apparatuses, and deletion based on the validity period is appropriately performed.

According to an aspect of the present disclosure, a print system including a plurality of print apparatuses, in which print data stored in any one of the print apparatuses is printable from other one of the print apparatuses, the print apparatuses each includes a memory storing instructions, and one or more processor executing the instructions to cause the print apparatus to receive print data transmitted from an information processing apparatus, store the received print data, register bibliographic information of the stored print data in a bibliography server, the bibliographic information including specification information for specifying a print apparatus storing the print data, and a reception date/time of the print data, transmit the stored print data, in response to a request from other print apparatus acquiring the bibliographic information managed by the bibliography server, acquire bibliographic information managed by the bibliography server, display a list of print data based on the acquired bibliographic information and receive selection of print data by a user from the displayed list, and based on the specification information included in bibliographic information of the print data that is selected as a print target, perform printing based on the print data in a case where the print data is stored in own apparatus, and perform printing based on the print data transmitted from other print apparatus by requesting the other print apparatus to transmit the print data in a case where the print data is stored in the other print apparatus, wherein the instructions further cause each of the print apparatuses to set a validity period of print data, and perform control to execute deletion based on a reception date/time included in bibliographic information of print data and the set validity period, for print data stored in own apparatus, and to not execute deletion based on a reception date/time included in bibliographic information of print data and the set validity period, for print data stored in other print apparatus, based on the specification information included in the acquired bibliographic information.

Further features of the present disclosure will become apparent from the following description of exemplary embodiments with reference to the attached drawings.

BRIEF DESCRIPTION OF THE DRAWINGS

FIG. 3 is a block diagram illustrating a software configuration of the multifunction peripheral.

FIG. 4 is a block diagram illustrating bibliographic information according to one or more aspects of the present disclosure.

DESCRIPTION OF THE EMBODIMENTS

Exemplary embodiments of the present disclosure will be described below with reference to the drawings.

<Network Configuration of Hold Remote Print System>

Figure 1:
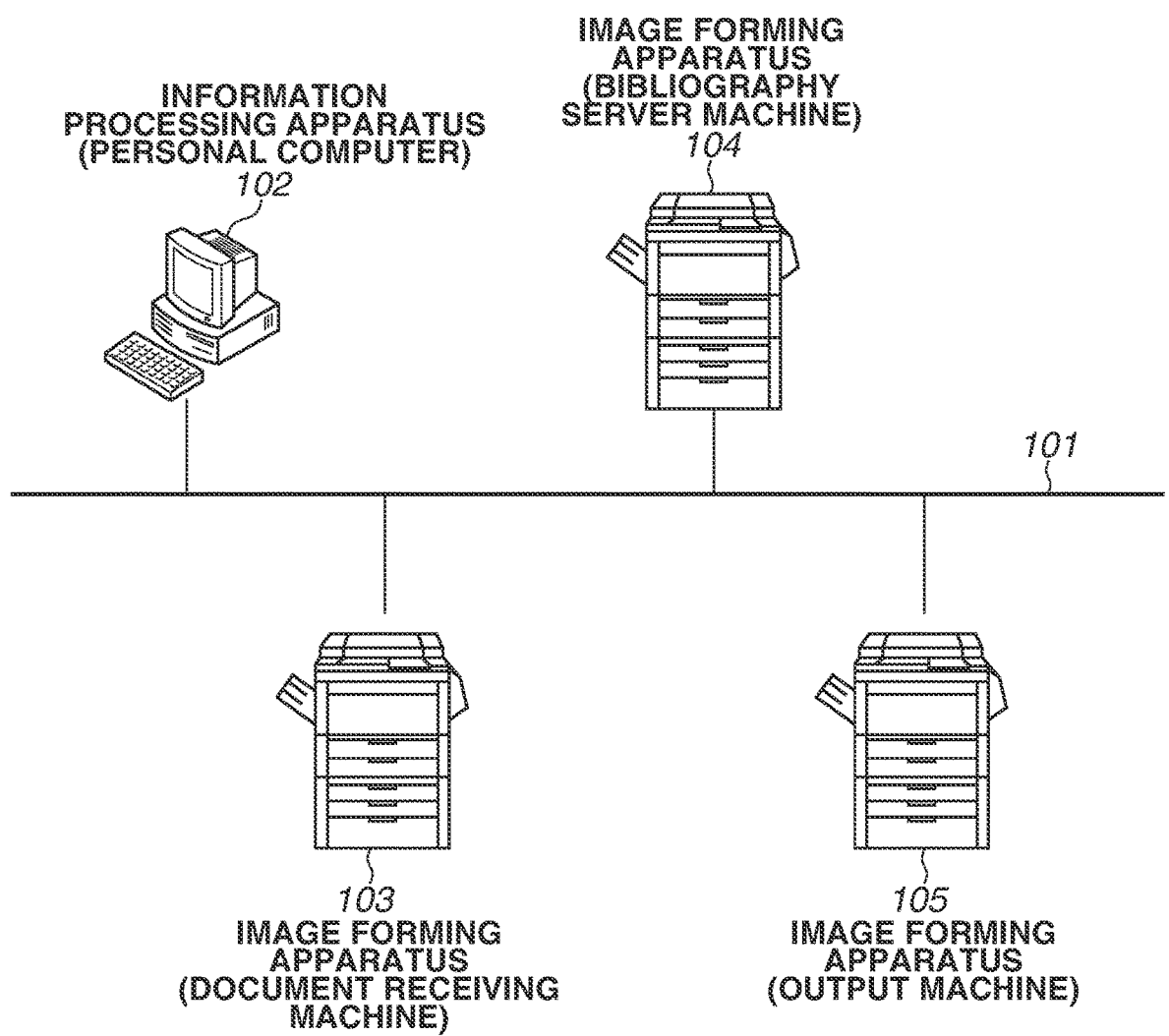
FIG. 1 is a diagram illustrating a network configuration of a hold remote print system.

FIG. 1 is a diagram illustrating a network configuration of a hold remote print system. A multifunction peripheral that is an image forming apparatus according to a first exemplary embodiment of the present disclosure is applicable to this network configuration. A network 101 illustrated in FIG. 1 is a network that supports, for example, Transmission Control Protocol/Internet Protocol (TCP/IP). A personal computer 102, which is an information processing apparatus, multifunction peripherals 103, 104, and 105 are connected to the network 101.

The multifunction peripheral 103 is a document receiving machine. Upon receiving a print job from the personal computer 102, the multifunction peripheral 103 (hereinafter may be referred to as the "document receiving machine 103") performs printing for the print job, or stores print data included in the print job to perform printing later. The multifunction peripheral 103 extracts bibliographic information from the received print job and transmits the extracted bibliographic information to the multifunction peripheral 104. The multifunction peripheral 104 is a bibliography server machine. The multifunction peripheral 104 (hereinafter may be referred to as the "bibliography server machine 104") collectively manages bibliographic information of print data stored in other multifunction peripherals. The multifunction peripheral 105 is an output machine. The multifunction peripheral 105 (hereinafter may be referred to as the "output machine 105") performs printing, by acquiring bibliographic information from the bibliography server machine 104 based on authentication information, and receiving print data from the document receiving machine 103 based on the acquired bibliographic information.

The above-described configuration is a typical configuration used to facilitate understanding of the description, and the personal computer 102, the document receiving machine 103, and the output machine 105 may each be more than one apparatus. The multifunction peripherals 103 to 105 each operate as the document receiving machine and also as the output machine. In other words, each of all the multifunction peripherals of the present system operates as the document receiving machine and also as the output machine, and one of the multifunction peripherals operates as the bibliography server machine.

<Schematic Configuration of Multifunction Peripherals 103 to 105>

Figure 2:
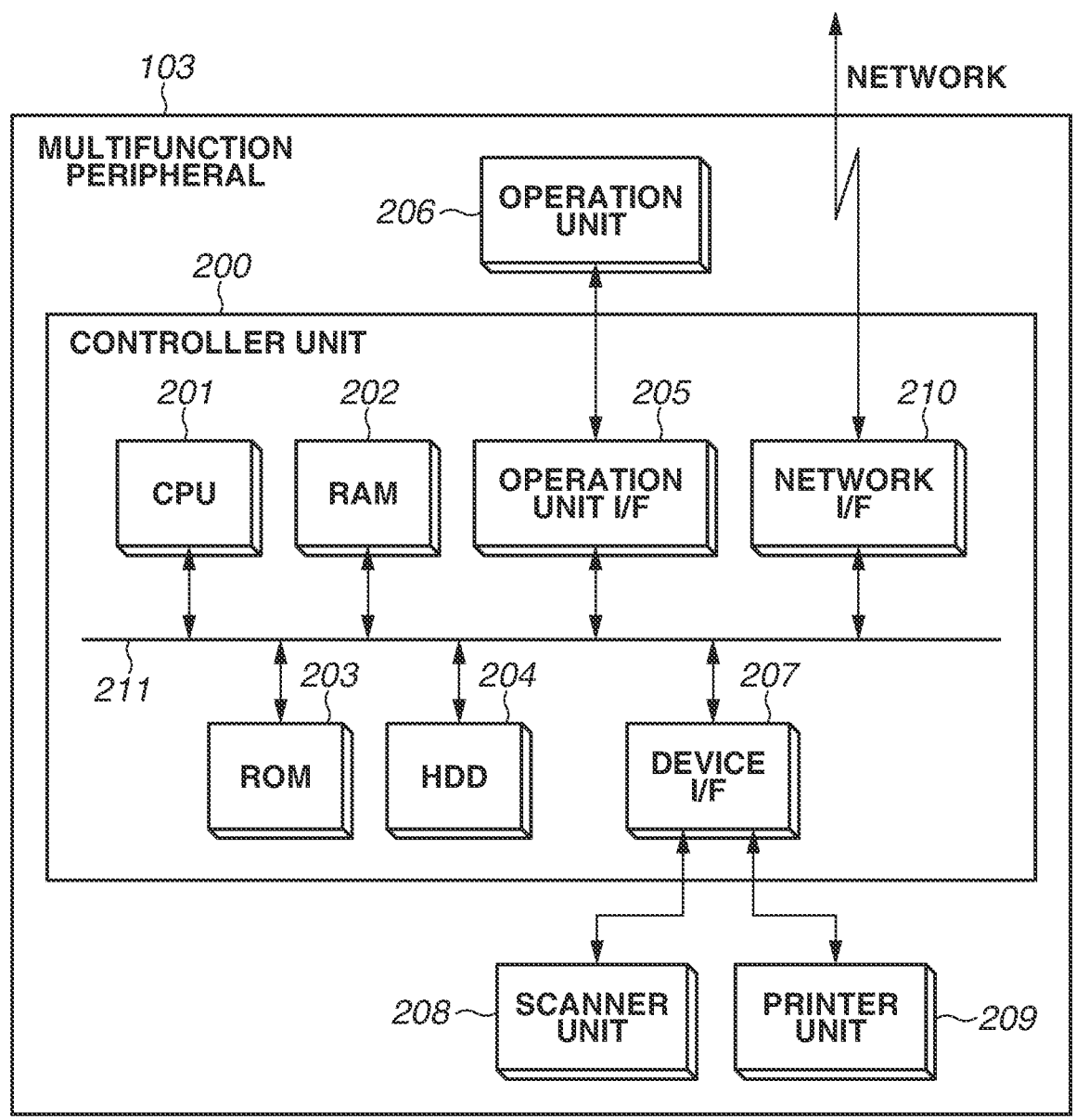
FIG. 2 is a block diagram illustrating a schematic configuration of a multifunction peripheral.

FIG. 2 is a block diagram illustrating a schematic configuration of each of the multifunction peripherals 103, 104, and 105 according to the first exemplary embodiment of the present disclosure. To simplify the description, the configuration in FIG. 2 will be described as the configuration of the multifunction peripheral 103.

In FIG. 2, the multifunction peripheral 103 includes a controller unit 200, an operation unit 206, a scanner unit 208, and a printer unit 209.

The controller unit 200 is a unit that controls a multifunction peripheral or printer. The controller unit 200 includes a central processing unit (CPU) 201, a random access memory (RAM) 202, a read only memory (ROM) 203, a hard disk drive (HDD) 204, an operation unit interface (I/F) 205, a device I/F 207, and a network I/F 210 that are connected by a system bus 211.

The CPU 201 controls the entire multifunction peripheral (the image forming apparatus) 103, by comprehensively controlling each device connected to the system bus 211. The RAM 202 stores an operating system, programs such as system software and application software, and data. The ROM 203 stores a boot program for the system, a system program, and an application program. The ROM 203 may further store information necessary for an image forming apparatus, such as font information. The HDD 204 stores the operating system, the system software, and the application software, as well as image data and setting data. The CPU 201 executes a program stored in the RAM 202, so that the program processes image data and data except for image that are stored in the RAM 202, the ROM 203, and the HDD 204. A small multifunction peripheral may be configured such that the HDD 204 is not mounted and the ROM 203 stores software such as the system software and the application software. Alternatively, there may be adopted a configuration in which other type of storage device such as a flash memory represented by a solid state disk (SSD) is provided in place of the HDD 204.

The operation unit I/F 205 is an interface with the operation unit 206 having a touch panel, and outputs image data to be displayed by the operation unit 206 to the operation unit 206. Further, the operation unit T/F 205 conveys information input on the operation unit 206 by a user to the CPU 201.

The device I/F 207 performs input and output of image data, by connecting the controller unit 200 to the scanner unit 208 and the printer unit 209 that are an image input device and an image output device, respectively. The image data input from the scanner unit 208 via the device I/F 207 is stored into the RAM 202 or the HDD 204. An application program stored in the RAM 202 executes processing such as image processing for the stored image data, as necessary. The image data is output to the printer unit 209 via the device I/F 207. The network I/F 210 performs input and output of image data with respect to an external apparatus on the network, or of information for controlling the multifunction peripheral, by connecting to the network.

The configuration is not limited to the example illustrated in FIG. 2, and may be other configuration as long as this configuration produces effects of the present exemplary embodiment. For example, in a case where a multifunction peripheral having a fax function is used, a modem I/F not illustrated in FIG. 2 may be provided in the controller unit 200, so that the modem I/F enables the multifunction peripheral to perform fax transmission by connecting to a public line via a modem. Alternatively, for example, the controller unit 200 may be provided with a Universal Serial Bus (USB) (not illustrated), so that the USB I/F enables the multifunction peripheral to perform printing by reading out data stored in a flash memory card.

<Software Configuration of Multifunction Peripherals 103 to 105>

FIG. 3 is a block diagram illustrating a software configuration of the multifunction peripherals 103 to 105 according to the first exemplary embodiment of the present disclosure. This software configuration is implemented in the controller unit 200. Software, which is stored in the multifunction peripheral or printer to be processed by the controller unit 200, is implemented as firmware, and the CPU 201 executes this software.

A real time operating system (OS) 301 provides a service and a framework for management of various resources optimized for control of an embedded system, for software that runs on the real time OS 301. Examples of the service and the framework provided by the real time OS 301 to manage various resources include multi-task management and inter-task communication. The multi-task management operates a plurality of processes substantially in parallel, by managing a plurality of contexts of process execution by the CPU 201. The inter-task communication implements synchronization and data exchange between tasks. The real time OS 301 also provides memory management, interrupt management, various device drivers, and a protocol stack for implementing processing of various protocols of a local interface, a network, and communication.

A controller platform 302 includes a file system 303, a job device control 304, and a counter 305. The file system 303 is a system for storing data constructed on a storage device such as the HDD 204 or the RAM 202, and is used for spooling a job to be handled by the controller unit 200 and for storing various data. The job device control 304 controls the hardware of the multifunction peripheral or printer, and mainly controls a job that uses basic functions (such as printing, scanning, communication, and image conversion) provided by the hardware. The counter 305 manages validity periods for each application, and counter values of printing and scanning.

A system service 306 is a module for monitoring the operation status of the multifunction peripheral or printer, and for downloading software and a license from a software distribution server via a network.

An application platform 307 is middleware for enabling the real time OS 301 and the mechanism of the controller platform 302 to be used from a system application 308 to be described below and an application 312 that can be added.

The system application 308 includes an authentication service 309, an access control 310, and a bibliographic information management 311.

The authentication service 309 executes authentication of a user, by performing matching for a user name and a password input via the operation unit 206 or the network, within a user database stored in the HDD 204. The authentication may be performed by an external authentication server such as Active Directory, instead of being performed based on the user database held in the HDD 204.

The access control 310 is a security module for permitting and prohibiting access to jobs and various resources, based on user authority or security setting in data.

The bibliographic information management 311 is a module that is implemented in the bibliography server machine, and manages the bibliographic information of print data stored in each of the multifunction peripherals connected to the network, for each user. The bibliographic information includes information of print data (document) input into a multifunction peripheral. Examples of such information include a reception date/time of print data, an IP address or directory path within a local device of a multifunction peripheral where print data is stored, a print data name, and print setting. The bibliographic information will be described in detail below with reference to FIG. 4.

The application 312 is a module capable of displaying a menu on the operation unit 206 and receiving an input from a user, and provides various functions to be implemented by the multifunction peripheral or printer.

A hold print application 313 is one of the applications 312, and performs, for example, display of a document list that is a list of hold print data, deletion of print data, determination for hold at the time of receiving a print job, and print output processing, <Configuration of Bibliographic Information Management Table>

FIG. 4 is a diagram illustrating an example of a bibliographic information management table to be managed by the bibliographic information management 311 for each user. FIG. 4 illustrates five pieces of bibliographic information. The bibliographic information is generated in the document receiving machine 103 and managed by the bibliography server machine 104, and the bibliography server machine 104 is requested to provide the bibliographic information at the time of login into the output machine 105. In other words, the bibliography server machine 104 manages the bibliographic information about all the print data held in each of the multifunction peripherals within the system.

The bibliographic information includes user name 400, reception date/time 403, IP address 404, directory path 405, job name 406 of print data, sheet size 407, N-in-one printing 408, page count 409, copy count 410, and two-sided setting 411. Here, the bibliographic information of two users, i.e., a user having a user name "sato" 401, and a user having a user name "yamada" 402, is illustrated. The reception date/time 403 indicates a date/time at which a print job is received. The IP address 404 indicates the IP address of a multifunction peripheral storing print data, and the directory path 405 indicates the path of a directory where print data is stored. In other words, each of the IP address 404 and the directory path 405 is specification information for specifying the storage location of print data. The job name 406 is identification information for identifying print data. The sheet size 407 to the two-sided setting 411 in print setting are set from an application on the personal computer 102 via a printer driver. Other types of print setting may also be held. Further, although not illustrated in FIG. 4, the bibliographic information may be provided with a post-print flag that indicates whether each piece of print data is already printed.

<Print Job Transmission Procedure>

There will be described an example of a procedure of transmission of a print job from the personal computer 102 to the multifunction peripheral 103 that is the document receiving machine by a user. The following description assumes that the authentication of the multifunction peripheral 103 is managed by the authentication service 309.

An example in which page description language (PDL) data is transmitted to the multifunction peripheral 103 as print data will be described in the present exemplary embodiment. Examples of the PDL include Image Processing System (LIPS) provided by Canon Inc., and PostScript provided by Adobe Inc. The multifunction peripheral 103 performs printing by interpreting the PDL and performing raster image processing (RIP) based on the interpretation. The print data may not be the PDL data, and may be in any type of format as long as the format can be interpreted and enables printing by the multifunction peripheral 103. For example, the print data may be image data in Tagged Image File Format (TIFF), or may be data in a document format of an application.

The user starts a printer driver from an application running on the personal computer 102. The user provides a print instruction, by selecting the multifunction peripheral 103 after making print setting from a printer driver screen (not illustrated). Here, the user can explicitly provide an instruction for performing hold printing.

Upon receiving the print instruction, the printer driver displays an authentication screen (not illustrated). The user inputs authentication information, and then confirms printing. The printer driver transmits an authentication request to the multifunction peripheral 103, together with a user name and a password. The authentication service 309 of the multifunction peripheral 103 performs matching for the received user name and password, and transmits an authentication result to the personal computer 102. The printer driver receives the authentication result, and terminates print processing by determining error exit if the authentication fails.

If the authentication is successful, the printer driver generates print data by converting application data into PDL data. Further, the printer driver generates a print job, by including the user information and the designated print setting in the print data. The printer driver transmits the generated print job to the multifunction peripheral 103.

Here, in a case where the personal computer 102 and the multifunction peripheral 103 are present in the same authentication domain, an authentication result for the personal computer 102 is guaranteed. In that case, an authentication request need not be sent to the multifunction peripheral 103, and the user information of the personal computer 102 may be used. Further, an authentication process from the printer driver may be omitted, and user information registered in the printer driver beforehand may be used.

<Print Job Receiving Processing Procedure>

Figure 7:
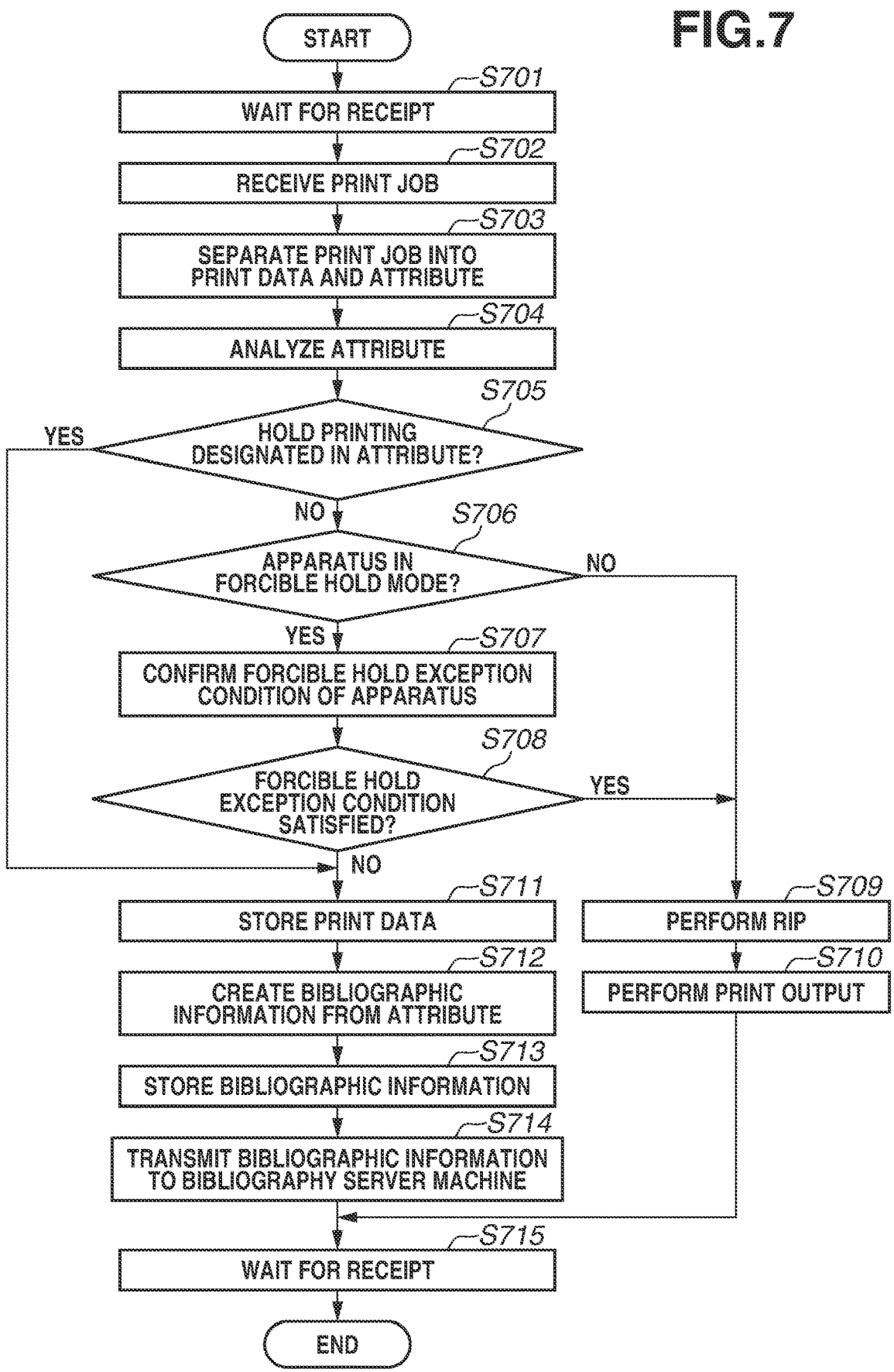
FIG. 7 is a flowchart illustrating an example of a processing procedure of a document receiving machine according to one or more aspects of the present disclosure.

FIG. 7 is a flowchart illustrating an example of a print job receiving processing procedure in the multifunction peripheral 103 that is the document receiving machine according to the first exemplary embodiment of the present disclosure. The CPU 201 of the multifunction peripheral 103 executes this procedure. FIG. 7 illustrates step S701 to step S715.

First, in step S701, the job device control 304 waits for receipt of a print job. In step S702, the job device control 304 receives a print job via the network I/F 210, and notifies the hold print application 313 of this receipt.

In step S703, the hold print application 313 separates the received print job into print data and attribute data. The print data is configured of PDL data and is a rendering target. The attribute data includes user information and designated print setting.

In step S704, the hold print application 313 analyzes the separated attribute data. In step S705, the hold print application 313 determines whether the hold printing is designated, by referring to the attribute data. If the hold print application 313 determines that the hold printing is designated (YES in step S705), the processing in and after step S711 is performed.

If the hold print application 313 determines that the hold printing is not designated (NO in step S705), the processing proceeds to step S706. In step S706, the hold print application 313 determines whether the multifunction peripheral 103 is in a forcible hold mode. If the multifunction peripheral 103 is not in the forcible hold mode (NO in step S706), the processing in and after step S709 is performed.

If the hold print application 313 determines that the multifunction peripheral 103 is in the forcible hold mode (YES in step S706), the processing proceeds to step S707. In step S707, the hold print application 313 confirms an exception condition for the forcible hold of the multifunction peripheral 103.

In step S708, the hold print application 313 determines whether the exception condition for the forcible hold is satisfied, based on the type of the PDL of the print data included in the received print job, and information about the print requesting source. If the exception condition is satisfied (YES in step S708), the print data is printed without being held and thus, print processing is performed in and after step S709.

If the exception condition is not satisfied (NO in step S708), the processing proceeds to step S711. In step S711, the hold print application 313 stores the print data received in step S702 into the HDD 204 of the multifunction peripheral 103.

In step S709, the job device control 304 performs the RIP for the PDL data that is the print data, based on the print setting. In step S710, the job device control 304 provides a print instruction to the printer unit 209, via the device I/F 207.

In step S712, the hold print application 313 creates bibliographic information from the attribute data.

In step S713, the hold print application 313 stores the created bibliographic information into the HDD 204 of the multifunction peripheral 103.

In step S714, the hold print application 313 transmits a request for registration of the created bibliographic information to the multifunction peripheral 104 that is the bibliography server machine.

In step S715, the hold print application 313 returns to the state of waiting for receiving a print job.

This ends the series of steps of document receiving processing.

<Bibliographic Information Management Procedure>

Figure 13:
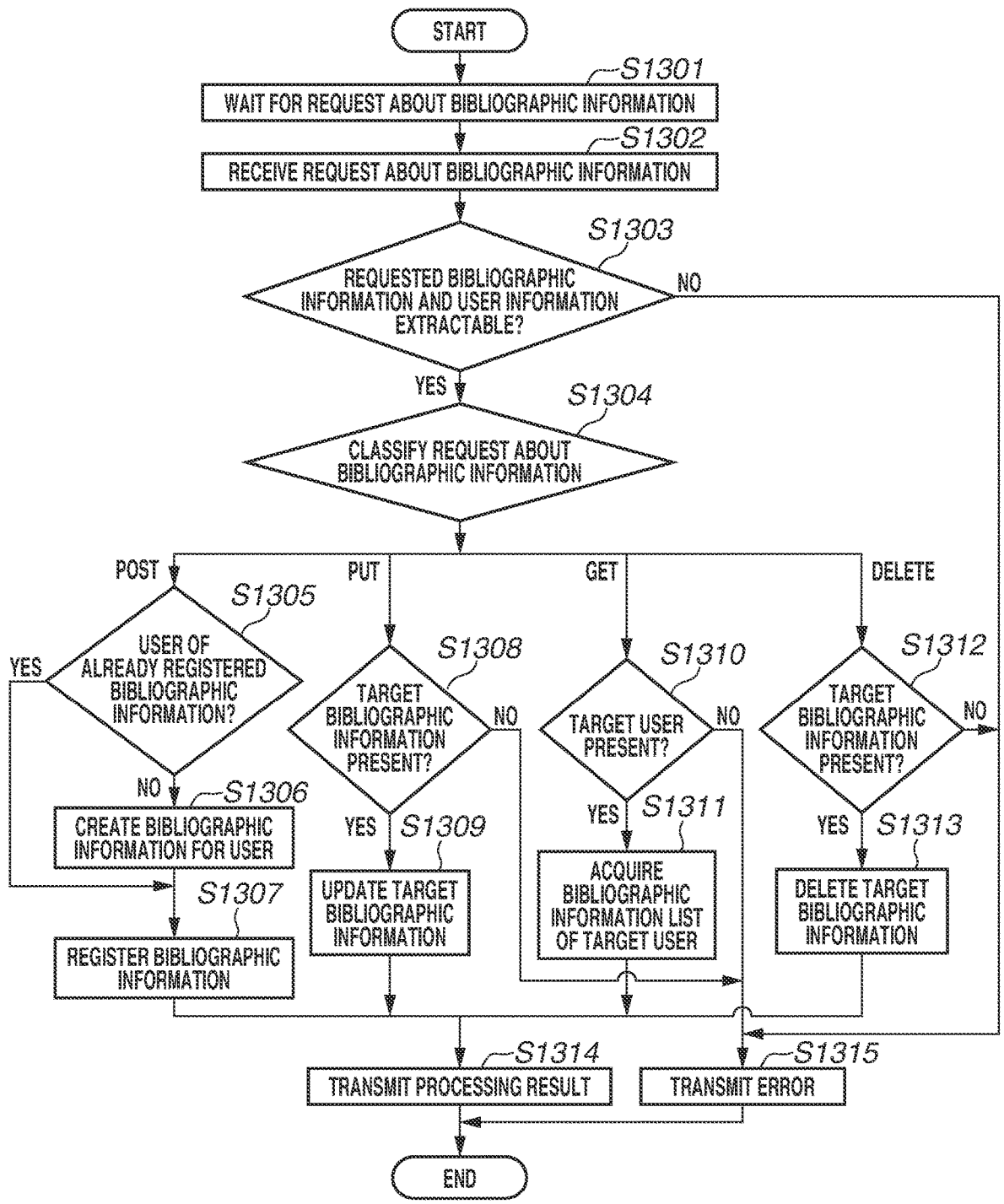
FIG. 13 is a flowchart illustrating an example of a processing procedure of a bibliography server machine according to one or more aspects of the present disclosure.

FIG. 13 is a flowchart illustrating an example of a bibliographic information management procedure of the multifunction peripheral 104 that is the bibliography server machine according to the first exemplary embodiment. The CPU 201 of the multifunction peripheral 104 executes the bibliographic information management procedure. FIG. 13 illustrates step S1301 to step S1315.

First, in step S1301, the hold print application 313 operating in the CPU 201 of the multifunction peripheral 104 is in a state of waiting for a request about bibliographic information issued from the multifunction peripherals 103, 104, and 105. In step S1302, the hold print application 313 receives a request about bibliographic information issued from the multifunction peripherals 103, 104, and 105.

In step S1303, the hold print application 313 determines whether requested bibliographic information and user information can be extracted from the received request. If the bibliographic information and the user information cannot be extracted (NO in step S1303), the processing proceeds to step S1315. In step S1315, an error is transmitted and then the processing ends.

If the bibliographic information and the user information can be extracted (YES in step S1303), the processing proceeds step S1304. In step S1304, the hold print application 313 branches the processing, based on the type of the request about the bibliographic information.

If the hold print application 313 determines that the request is for new registration of bibliographic information in step S1304, the processing proceeds to step S1305. In step S1305, the hold print application 313 performs bibliographic information registration processing.

Specifically, in step S1305, the hold print application 313 determines whether the new registration of bibliographic information is for a user who is already registered. If the new registration of bibliographic information is for a user who is not registered (NO in step S1305), the processing proceeds to step S1306. In step S1306, the hold print application 313 creates bibliographic information for the user.

In step S1307, the hold print application 313 performs registration of target bibliographic information as the new registration.

If the hold print application 313 determines that the request is for an update of bibliographic information in step S1304, the processing proceeds to step S1308. In step S1308, the hold print application 313 executes processing for updating target bibliographic information.

Specifically, in step S1308, the hold print application 313 determines whether the target bibliographic information for updating is present. If the target bibliographic information for updating is not present (NO in step S1308), the processing proceeds to step S1315. In step S1315, an error is transmitted and then the series of steps of processing ends. If the target bibliographic information for updating is present (YES in step S1308), the processing proceeds to step S1309. In step S1309, the hold print application 313 updates the target bibliographic information.

If the hold print application 313 determines that the request is for acquisition of bibliographic information in step S1304, the processing proceeds to step S1310. In step S1310, the hold print application 313 executes processing for acquisition of target bibliographic information.

Specifically, in step S1310, the hold print application 313 determines whether a target user for acquisition of bibliographic information is present. If the target user is not present (NO in step S1310), the processing proceeds to step S1315. In step S1315, an error is transmitted and then the series of steps of processing ends. If the target user is present (YES in step S1310), the processing proceeds to step S1311. In step S1311, the hold print application 313 acquires a bibliographic information list of the target user.

If the hold print application 313 determines that the request is for deletion of bibliographic information in step S1304, the processing proceeds to step S1312. In step S1312, the hold print application 313 executes processing for deletion of target bibliographic information.

Specifically, in step S1312, the hold print application 313 determines whether the target bibliographic information for deletion is present. If the target bibliographic information for deletion is not present (NO in step S1312), the processing proceeds to step S1315. In step S1315, an error is transmitted and then the series of steps of processing ends. If the target bibliographic information for deletion is present (YES in step S1312), the processing proceeds to step S1313. In step S1313, the hold print application 313 deletes the target bibliographic information.

In step S1314, the hold print application 313 transmits a processing result in the form of a response to each of the requests, and the series of steps of processing ends.

<Document List Display Processing Procedure>

Figure 8:
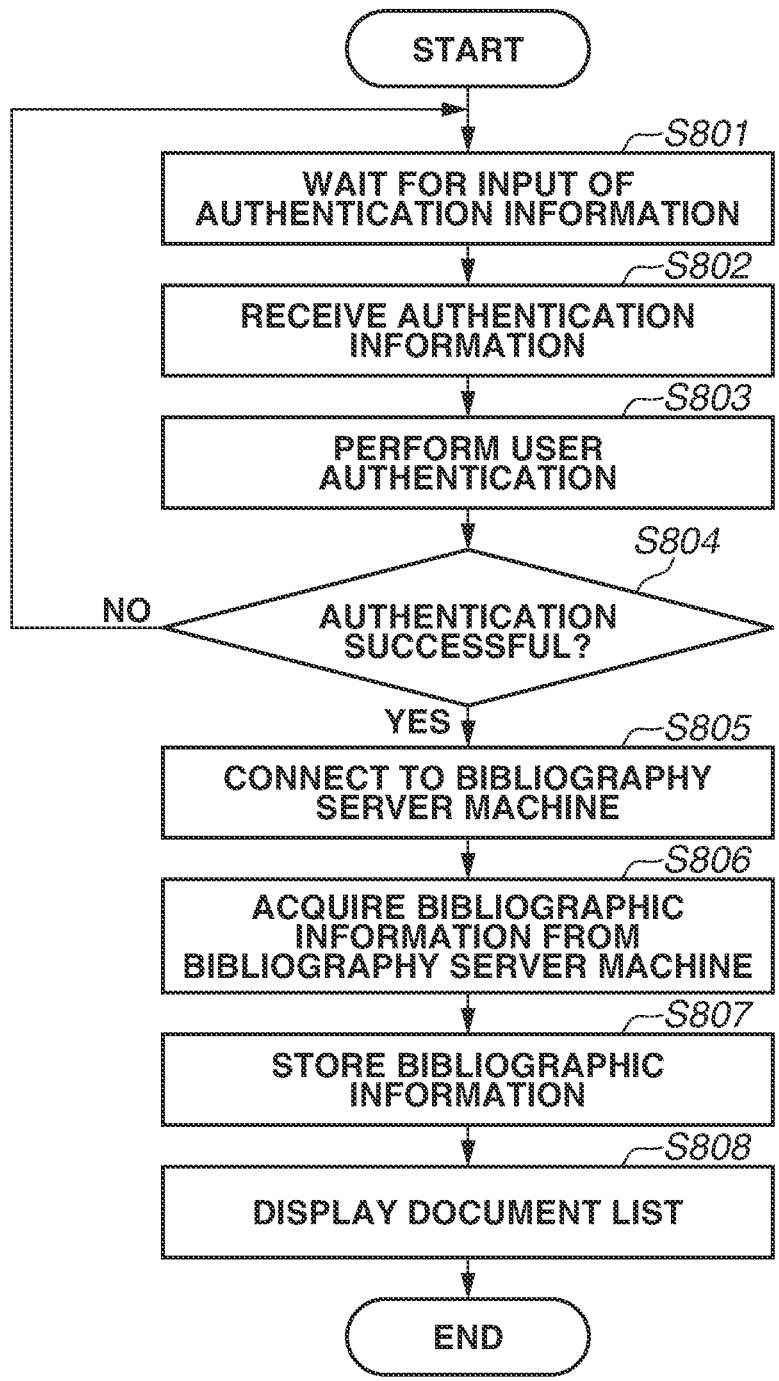
FIG. 8 is a flowchart illustrating an example of a document list display processing procedure of an output machine according to one or more aspects of the present disclosure.

FIG. 8 is a flowchart illustrating an example of a document list display processing procedure in the multifunction peripheral 105 that is the output machine according to the first exemplary embodiment. The CPU 201 of the multifunction peripheral 105 executes the document list display processing procedure. FIG. 8 illustrates step S801 to step S808.

First, in step S801, the authentication service 309 displays an authentication screen (not illustrated) and then waits for an input of authentication information. In step S802, the operation unit 206 receives an input of authentication information from a user, and then transmits the authentication information to the authentication service 309 via the operation unit I/F 205.

In step S803, the authentication service 309 performs user authentication. In step S804, the authentication service 309 determines whether the authentication is successful. If the authentication service 309 determines that the authentication is successful (YES in step S804), the authentication service 309 notifies the application 312 (the hold print application 313) of the authentication result, and processing in and after step S805 is performed. If the authentication service 309 determines that the authentication is unsuccessful (NO in step S804), the processing returns to step S801.

In step S805, the hold print application 313 performs network connection to the bibliography server machine 104, for the authenticated user.

In step S806, the hold print application 313 transmits a request for acquiring the bibliographic information of the authenticated user to the connected bibliography server machine 104, and acquires the bibliographic information from the bibliography server machine 101 in response to the request. For example, in a case where the user having the user name of "Sato" logs in, the hold print application 313 acquires the bibliographic information corresponding to the user name "Sato" 401 in the bibliographic information in FIG. 4.

In step S807, the hold print application 313 stores the bibliographic information corresponding to the authenticated user and acquired from the bibliography server machine 104, into the HDD 204.

In step S808, the hold print application 313 displays a list of print data to be printed or deleted (a document list) on the operation unit 206, based on the acquired bibliographic information. This ends the series of steps of processing.

In this way, at the timing when a user logs in to the multifunction peripheral 105, synchronous processing is performed for the bibliographic information about the print data of the login user, among the latest bibliographic information managed by the bibliography server machine 104.

<Description of Document List Screen>

Figure 5:
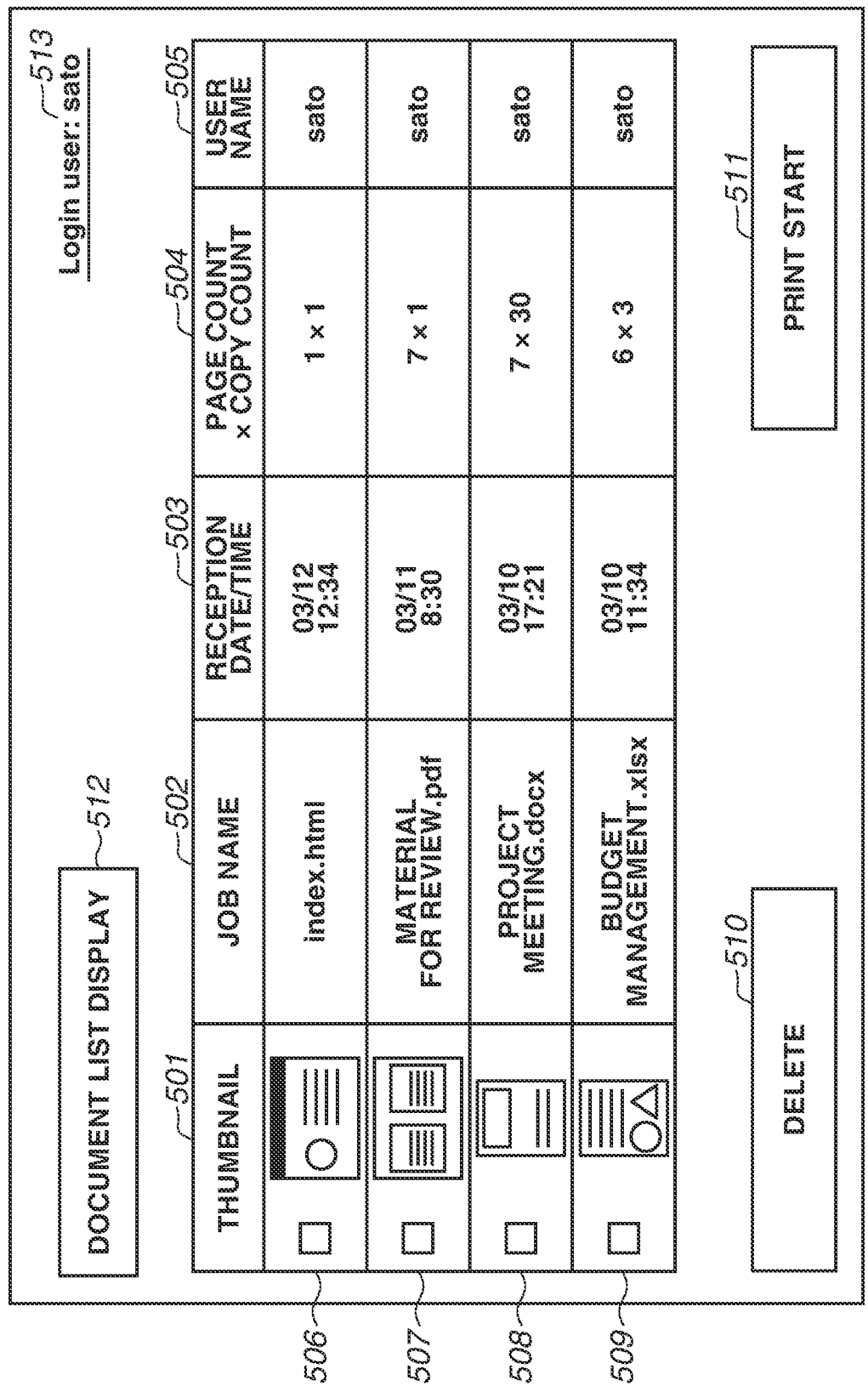
FIG. 5 illustrates an example of a hold print document list screen to be displayed by the multifunction peripheral.

FIG. 5 is an example of a document list screen in the multifunction peripheral 105 that is the output machine according to the first exemplary embodiment. The hold print application 313 executed by the CPU 201 of the multifunction peripheral 105 displays this screen on the operation unit 206.

In the document list screen, a list of print data that can be printed or deleted (a document list) appears for an authenticated user. The document list is generated from the bibliographic information stored in the HDD 204 in step S807 in FIG. 8. FIG. 5 illustrates a screen example to be displayed during the login of the user having the user name "Sato".

Thumbnail 501, job name 502, reception date/time 503, page count X copy count 504, and user name 505 are displayed for each document list. Four pieces of printable or deletable print data (print data 506 to 509) are displayed on this screen. This screen displays a delete button 510 and a print start button 511. The user selects desired print data from the list, and deletes or prints the selected print data, by pressing the corresponding one of these buttons. An update button (a document list display button) 512 is provided to update the document list. When the update button 512 is pressed, the latest bibliographic information is acquired from the bibliography server machine 104, and the document list is thereby updated. A message 513 indicates the login user.

<Print Processing Procedure>

Figure 12:
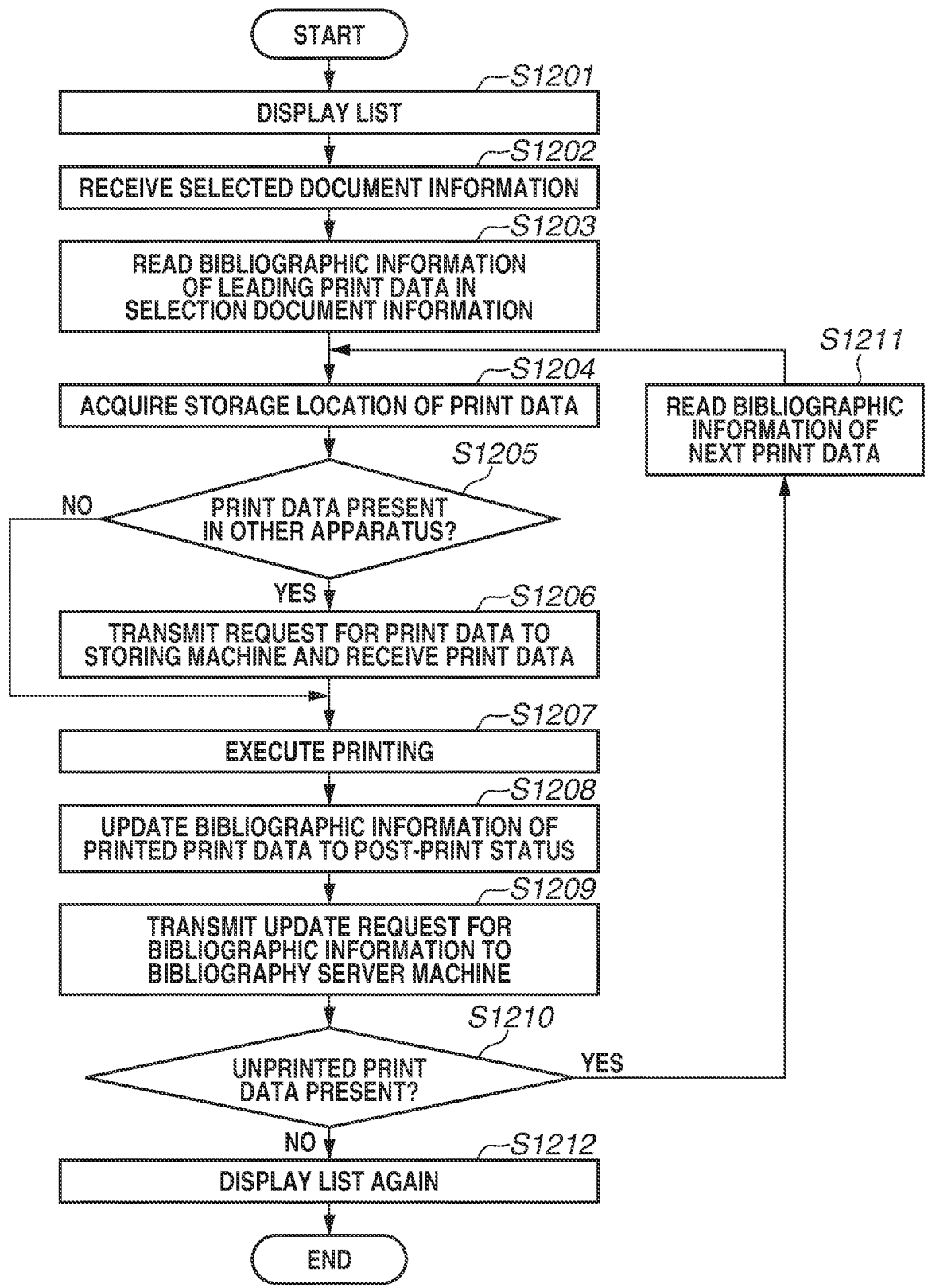
FIG. 12 is a flowchart illustrating an example of a print procedure of the output machine according to one or more aspects of the present disclosure.

FIG. 12 is a flowchart illustrating an example of a print processing procedure to be performed when the print start button 511 is pressed for a document selected by a user in the multifunction peripheral 105 that is the output machine according to the first exemplary embodiment. The CPU 201 of the multifunction peripheral 105 executes the print processing procedure. FIG. 12 illustrates step S1201 to step S1212.

First, in step S1201, the hold print application 313 displays a document list (FIG. 5) on the operation unit 206 of the multifunction peripheral 105.

In step S1202, the hold print application 313 receives selection document information from the application platform 307. The selection document information indicates print data selected by the user as a print target, among the print data 506 to 509 in the displayed document list.

In step S1203, the hold print application 313 reads the bibliographic information of the leading print data in the received selection document information, from the HDD 204.

In step S1204, the hold print application 313 extracts storage location information (the IP address 404 and the directory path 405) of the print data included in the bibliographic information.

In step S1205, the hold print application 313 determines whether the print data is present in other apparatus (i.e., in the own apparatus or in other apparatus), based on the extracted storage location information of the print data. If the print data is present in other apparatus (YES in step S1205), the processing proceeds to step S1206.

In step S1206, the hold print application 313 transmits a request for the print data to the document receiving machine 103 storing the print data, and receives the print data from the document receiving machine 103, via the network I/F 210.

In step S1207, the hold print application 313 executes the print processing via the application platform 307, for the print data held in the HDD 204 or the print data acquired from the document receiving machine 103 in step S1206.

In step S1208, the hold print application 313 updates the bibliographic information to raise the post-print flag included in the bibliographic information about the printed print data, and stores the updated bibliographic information into the HDD 204.

In step S1209, the hold print application 313 transmits an update request for the bibliographic information to the bibliography server machine 104.

In step S1210, the hold print application 313 confirms whether all pieces of print data for which the print instruction is provided are printed (i.e., whether unprinted print data is present). If unprinted print data is present (YES in step S1210), the processing proceeds to step S1211. In step S1211, the hold print application 313 reads the bibliographic information of the next print data, and then repeats the processing in and after step S1204.

If unprinted print data is not present (NO in step S1210), the processing proceeds to step S1212. In step S1212, the hold print application 313 displays the document list again on the operation unit 206. In this displayed document list, the printed print data is not displayed. The series of steps of print processing thus ends.

Figure 14:
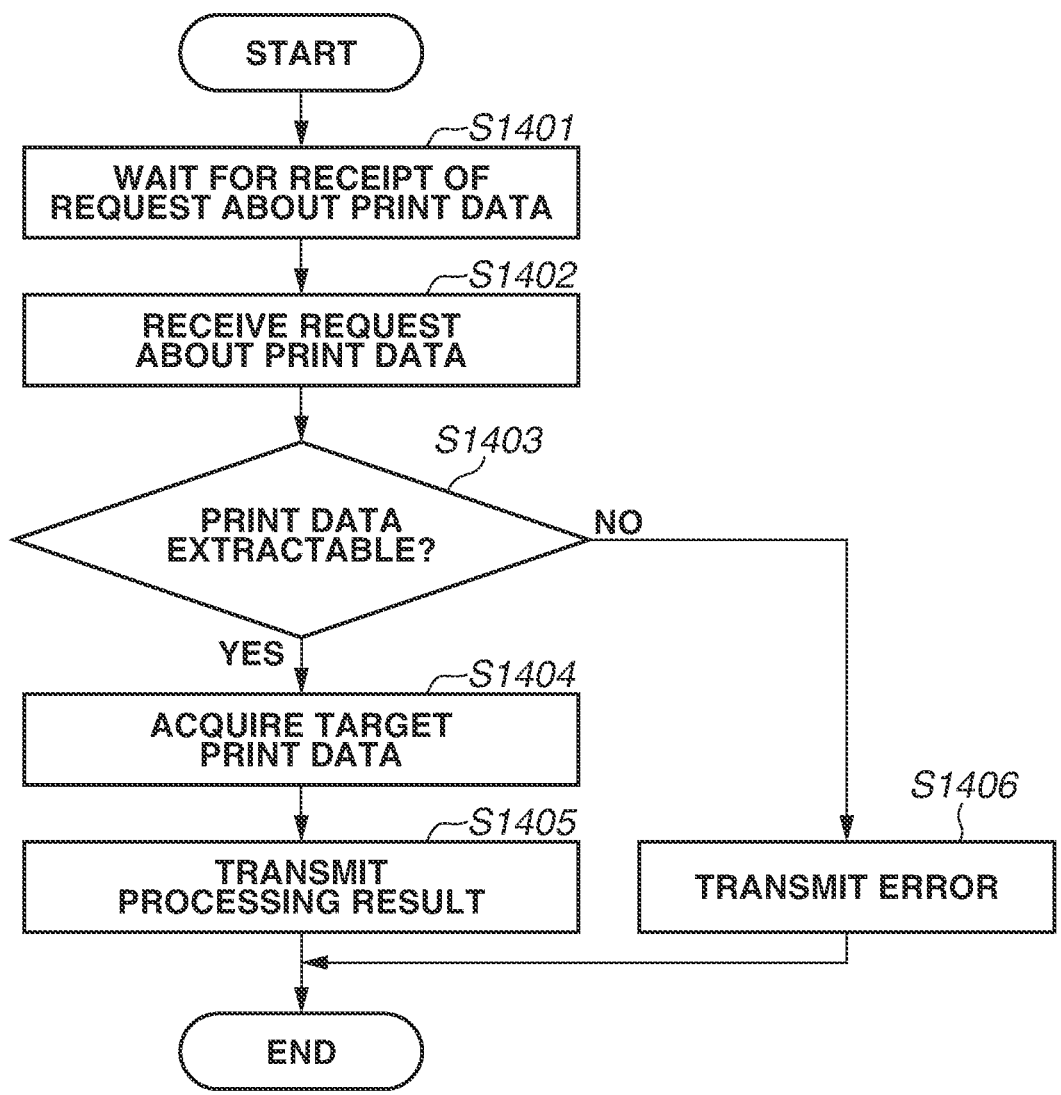
FIG. 14 is a flowchart illustrating an example of a print data transmission procedure of the document receiving machine according to one or more aspects of the present disclosure.

FIG. 14 is a flowchart of processing to be performed in a case where a request about held print data is received, in the multifunction peripheral 103 that is the document receiving machine according to the first exemplary embodiment. The CPU 201 of the multifunction peripheral 103 executes this processing. FIG. 14 illustrates step S1401 to step S1406.

First, in step S1401, the hold print application 313 waits for receipt of a request about print data from the multifunction peripheral 104 or 105. In step S1402, the hold print application 313 receives a request for print data. Examples of the request to receive here include a transmission request for print data which is transmitted in step S1206 in FIG. 12 from the multifunction peripheral 105 that is the output machine, and a deletion request for print data transmitted in FIG. 10 to be described below. In step S1403, the hold print application 313 determines whether the target print data in the request can be extracted. If the print data cannot be extracted (NO in step S1403), i.e., if the target print data is not present in the HDD 204, the processing proceeds to step S1406. In step S1406, the print application 313 transmits error information to the request source, and then the series of steps of processing ends.

If the print data can be extracted (YES in step S1403), the processing proceeds to step S1404. In step S1404, the hold print application 313 acquires the target print data by reading this print data from the HDD 204.

In step S1405, the hold print application 313 transmits a processing result about the acquired print data to the request source. If the request received in step S1402 is the transmission request for print data, the hold print application 313 transmits the target print data to the request source. If the received request is the deletion request for print data, the hold print application 313 deletes the target print data, and transmits a response indicating the completion of the deletion to the request source. This completes the series of steps of processing.

<Description of Setting Change Screen for Document Validity Period>

Figure 6:
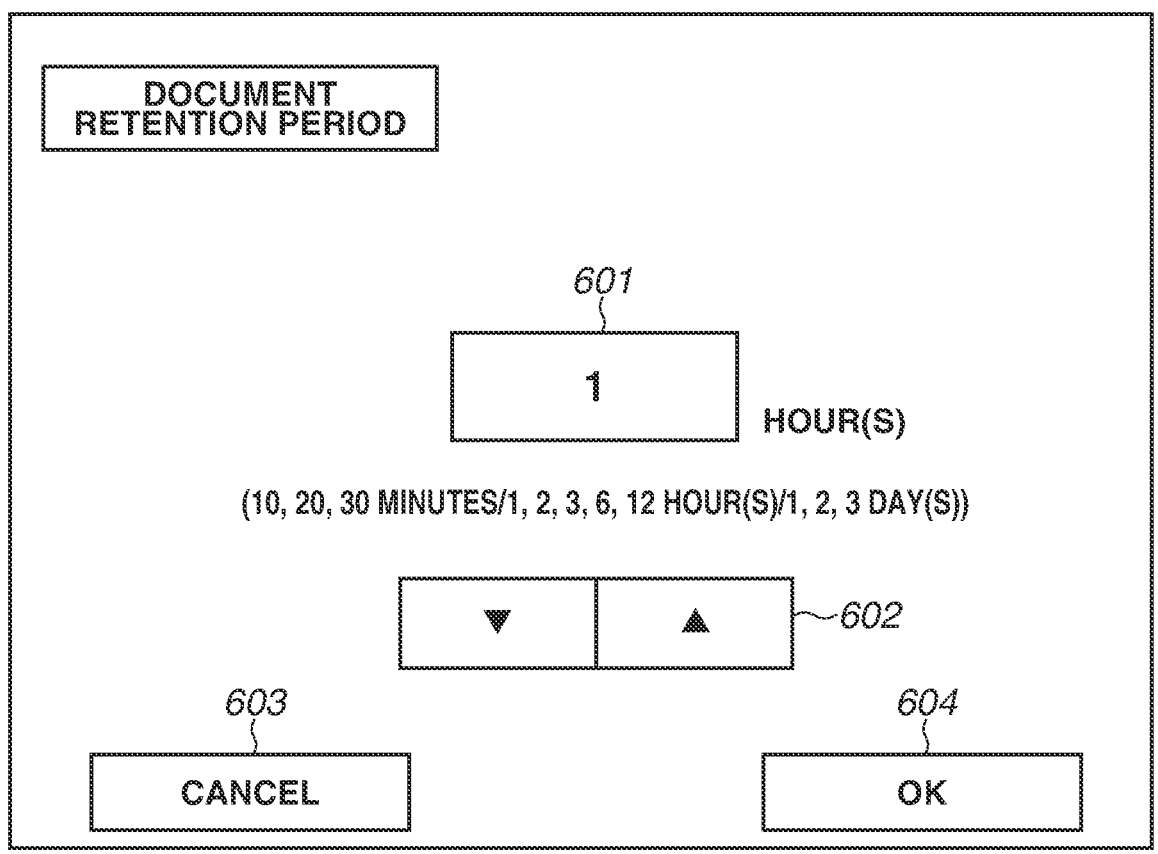
FIG. 6 illustrates an example of a document validity period setting screen to be displayed by the multifunction peripheral.

FIG. 6 is an example of a screen for setting a retention period of print data held in each of the multifunction peripherals 103, 104, and 105 according to the first exemplary embodiment (hereinafter may be referred to as the "held document"). This screen is displayed on the operation unit 206 by the hold print application 313 executed by the CPU 201 of each of the multifunction peripherals 103, 104, and 105, and can be operated.

When a button (not illustrated) for setting a retention period for the held document is pressed by a user, the hold print application 313 receives an event of transition from the application platform 307 to the setting screen, and displays the screen illustrated in FIG. 6 on the operation unit 206.

On this screen, a retention period for a document can be set. A retention period to be set is displayed in a retention period display portion 601. As illustrated in the example in FIG. 6, there is a plurality of settable periods from ten minutes to three days, and these setting values can each be changed with setting keys 602. A cancel button 603 is pressed to cancel the changed setting value, and an OK button 604 is pressed to use the changed setting value, so that the retention period for the held document can be set.

<Automatic Deletion Processing Procedure>

Figure 9A:
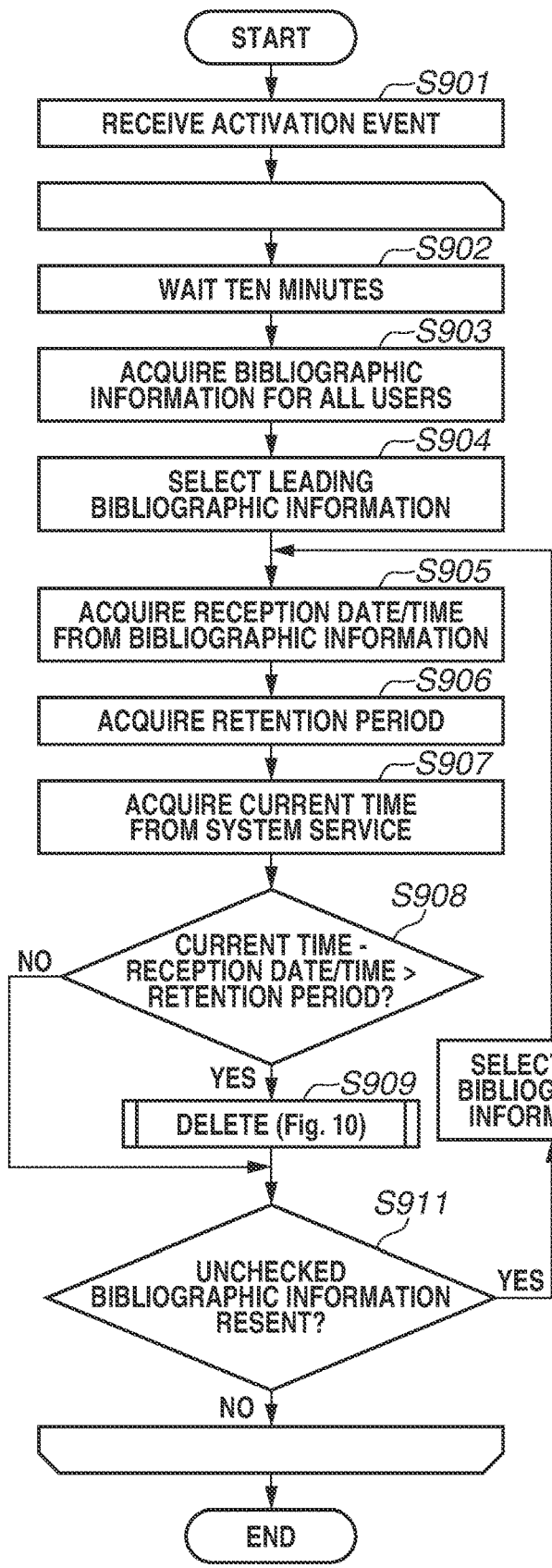
FIG. 9A is a flowchart illustrating an example of an automatic deletion processing procedure of a multifunction peripheral according to one or more aspects of the present disclosure.

FIG. 9A is a flowchart illustrating an example of an automatic deletion processing procedure for a document held in each of the multifunction peripherals 103, 104, and 105 according to the first exemplary embodiment. The automatic deletion processing procedure accompanies the expiration of the retention period of the document. The CPU 201 of each of the multifunction peripherals 103, 104, and 105 executes the automatic deletion processing procedure. FIG. 9A illustrates step S901 to step S911. Here, the processing in the multifunction peripheral 105 will be described as an example.

First, in step S901, when the multifunction peripheral 105 is activated by power-on, the hold print application 313 receives an activation event from the application platform 307.

In step S902, the hold print application 313 waits until ten minutes have elapsed since the receipt of the activation event.

In step S903, the hold print application 313 reads bibliographic information for all users whose authentication is managed by the authentication service 309, from the HDD 204 via the file system 303, and loads the read bibliographic information into the RAM 202. The bibliographic information stored in the HDD 204 is the bibliographic information acquired in step S806 in FIG. 8 when the user logs in, or the bibliographic information acquired when the update button 512 is pressed in the document list screen in FIG. 5.

In step S904, the hold print application 313 selects the leading bibliographic information from the acquired bibliographic information. In step S905, the hold print application 313 acquires the reception date/time 403 from the selected bibliographic information.

In step S906, the hold print application 313 acquires the retention period of the document set in the screen in FIG. 6, by reading this retention period from the HDD 204 via the file system 303.

In step S907, the hold print application 313 acquires the current time from the system service 306.

In step S908, the hold print application 313 determines whether the print data corresponding to the selected bibliographic information has been retained longer than the retention period. This determination is performed based on whether an expression of "current time−reception date/time>retention period" is satisfied.

If the print data corresponding to the selected bibliographic information has been retained longer than the retention period (YES in step S908), the processing proceeds to step S909. In step S909, the hold print application 313 performs deletion processing for the print data. The deletion processing in step S909 will be described with reference to FIG. 10.

If the print data corresponding to the selected bibliographic information has not been retained longer than the retention period (NO in step S908), the deletion processing is not executed by the hold print application 313, and the processing proceeds to step S911.

In step S911, the hold print application 313 determines whether unchecked bibliographic information is present, i.e., whether bibliographic information undetermined in terms of validity period expiration is present, among the acquired bibliographic information. If the undetermined bibliographic information is present (YES in step S911), the processing proceeds to step S910. In step S910, the hold print application 313 selects the next bibliographic information. The hold print application 313 then performs the processing from step S905 to step S910, for all the bibliographic information.

Upon completion of the determination for the validity period expiration for all the bibliographic information, the series of steps of automatic deletion processing ends. The next automatic deletion processing from step S902 to step S911 is performed after ten minutes. Therefore, the automatic deletion processing is performed in each of the multifunction peripherals 103, 104, and 105 every ten minutes. In other words, the determination of the automatic deletion is performed every predetermined time.

<Manual Operation Deletion Processing Procedure>

Figure 9B:
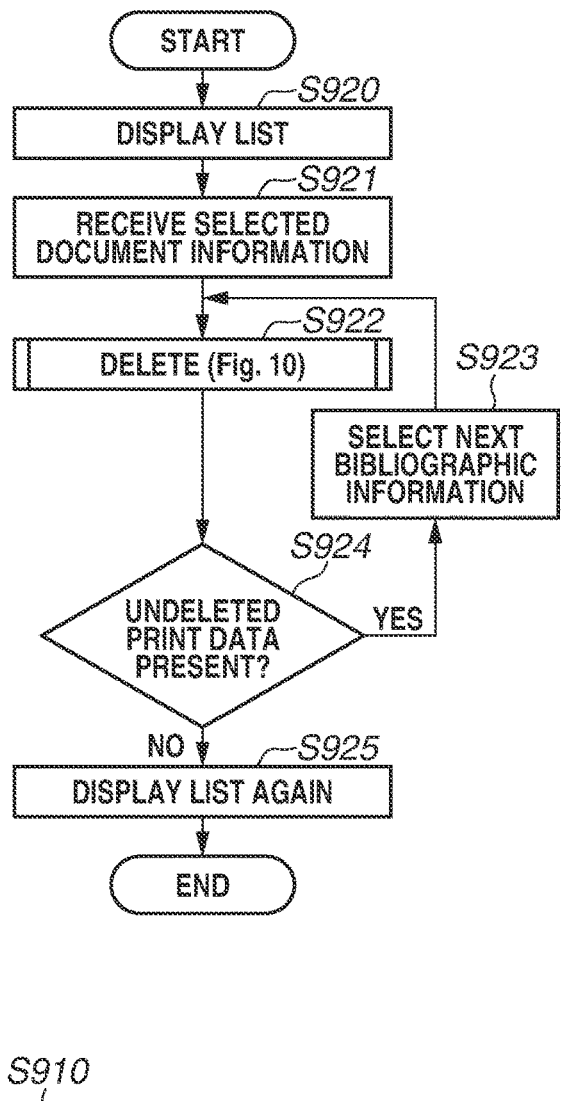
FIG. 9B is a flowchart illustrating an example of a manual deletion processing procedure of the multifunction peripheral according to one or more aspects of the present disclosure.

FIG. 9B is a flowchart illustrating an example of a manual deletion processing procedure to be performed when the delete button is pressed for a document selected by a user in each of the multifunction peripherals 103, 104, and 105 according to the first exemplary embodiment. The CPU 201 of each of the multifunction peripherals 103, 104, and 105 executes this flowchart. FIG. 9B illustrates step S920 to step S925.

First, in step S920, the hold print application 313 displays the document list (FIG. 5) on the operation unit 206 of the multifunction peripheral 105.

In step S921, the hold print application 313 receives, from the application platform 307, information (selection document information) of print data whose deletion is requested by the user among the print data 506 to 509 in the displayed document list. The hold print application 313 reads all the bibliographic information of the print data selected as a deletion target from the HDD 204, based on the information received from the application platform 307.

In step S922, the hold print application 313 performs deletion processing for one piece of the bibliographic information read from the HDD 204 and the print data corresponding to this piece of bibliographic information. The deletion processing in step S922 will be described with reference to FIG. 10.

In step S924, the hold print application 313 confirms whether all the print data in the deletion instruction is deleted (i.e., whether undeleted print data is present). If undeleted print data is present (YES in step S924), the processing proceeds to step S923. In step S923, the hold print application 313 selects the next bibliographic information, and performs the deletion processing in step S922.

If undeleted print data is not present (NO in step S924), the processing proceeds to step S925. In step S925, the hold print application 313 displays the document list again on the operation unit 206. In this displayed document list, the deleted document data is not displayed. This completes the series of steps of manual deletion processing.

<Deletion Processing Procedure>

Figure 10:
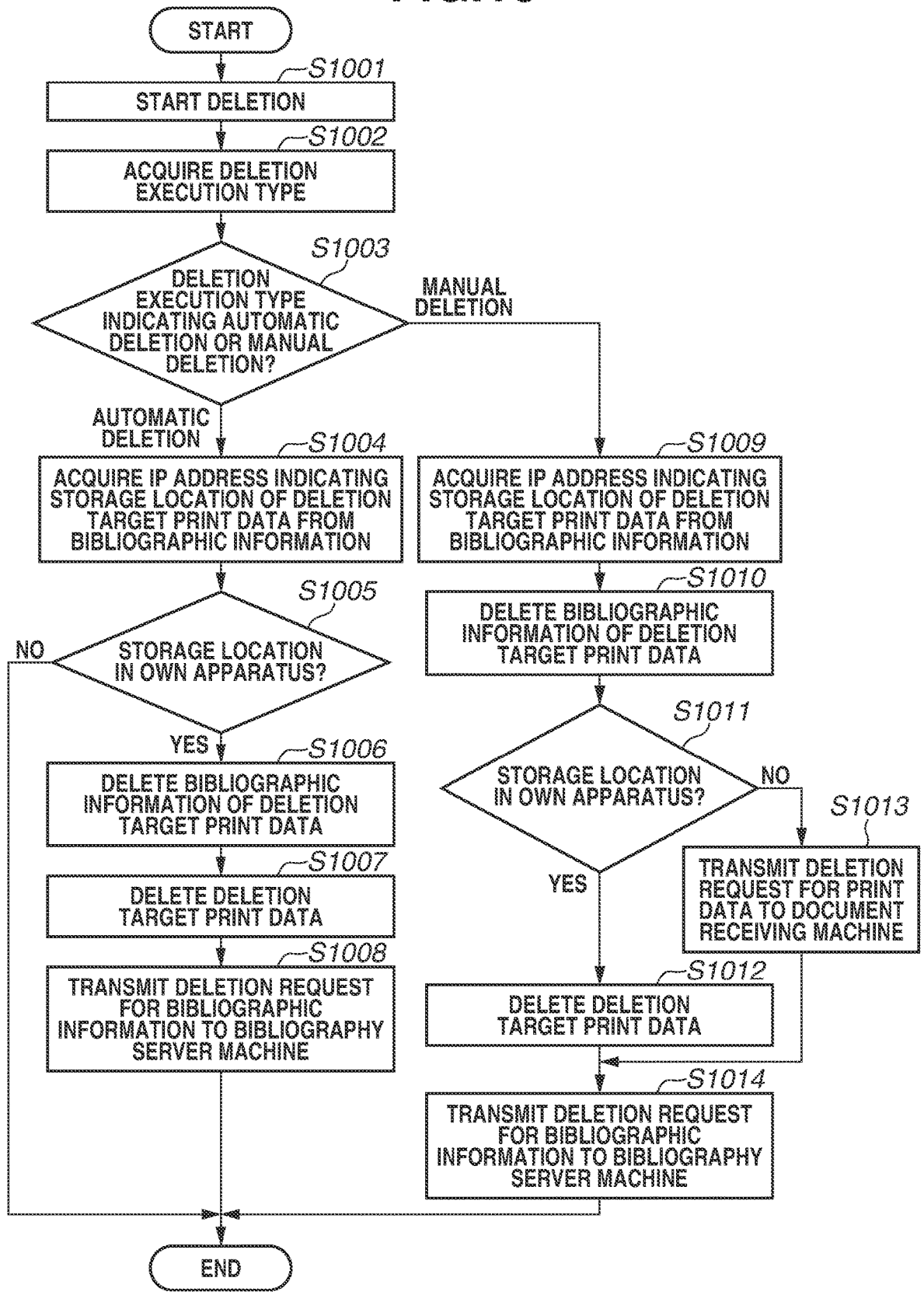
FIG. 10 is a flowchart illustrating an example of a deletion processing procedure of the multifunction peripheral according to one or more aspects of the present disclosure.

FIG. 10 is a flowchart illustrating an example of the deletion processing procedure performed in each of step S909 in FIG. 9A and step S922 in FIG. 9B. The CPU 201 of each of the multifunction peripherals 103, 104, and 105 executes the deletion processing procedure. FIG. 10 illustrates step S1001 to step S1014.

First, in step S1001, the hold print application 313 starts the deletion processing for the print data.

In step S1002, the hold print application 313 acquires a deletion execution type indicating which one of step S909 of the automatic deletion processing and step S922 of the manual deletion processing has called this procedure.

In step S1003, the hold print application 313 changes the processing, depending on which one of the automatic deletion and the manual deletion is indicated by the deletion execution type.

If the deletion execution type is determined to be the automatic deletion in step S1003, the processing proceeds to step S1004. In step S1004, the hold print application 313 acquires the IP address 404 indicating the storage location of the print data, from the bibliographic information 400 of the deletion target print data stored in the HDD 204. If the deletion execution type is the manual deletion, the processing proceeds to step S1009.

In step S1005, the hold print application 313 determines whether the storage location of the print data is in the own apparatus (i.e., in the own apparatus or in other apparatus), based on the acquired IP address.

If the hold print application 313 determines that the storage location of the print data is in other apparatus (NO in step S1005), the processing ends without deleting the print data and the bibliographic information.

If the hold print application 313 determines that the storage location of the print data is in the own apparatus (YES in step S1005), the processing proceeds to step S1006. In step S1006, the hold print application 313 deletes the bibliographic information 400 of the deletion target print data stored in the HDD 204.

In step S1007, the hold print application 313 detects the deletion target print data stored in the HDD 204 based on the directory path 405 of the bibliographic information, and deletes the detected print data.

In step S1008, the hold print application 313 transmits a deletion request for the bibliographic information of the deleted print data to the bibliography server machine 104, and then the series of steps of processing ends.

In step S1009, the hold print application 313 acquires the IP address 404 indicating the storage location of the print data, from the bibliographic information 400 of the deletion target print data stored in the HDD 204.

In step S1010, the hold print application 313 deletes the bibliographic information 400 of the deletion target print data stored in the HDD 204.

In step S1011, the hold print application 313 determines whether the storage location of the deletion target print data is in the own apparatus (i.e., in the own apparatus or in other apparatus), based on the acquired. IP address of the storage location.

If the hold print application 313 determines that storage location of the deletion target print data is in the own apparatus (YES in step S1011), the processing proceeds to step S1012. In step S1012, the hold print application 313 deletes the deletion target print data stored in the HDD 204.

If the hold print application 313 determines that storage location of the deletion target print data is in other apparatus (NO in step S1011), the processing proceeds to step S1013. In step S1013, the hold print application 313 transmits a deletion request for this print data, to the document receiving machine 103 storing the print data. In the document receiving machine 103, the target print data is deleted by the above-described processing in FIG. 14.

In step S1014, the hold print application 313 transmits a deletion request for the bibliographic information of the deleted print data to the bibliography server machine 104, and the series of steps of deletion processing ends.

Based on the deletion request transmitted in step S1008 or step S1014, the bibliography server machine 104 deletes the corresponding bibliographic information in step S1313 in FIG. 13. Therefore, afterward, when other multifunction peripheral displays a document list by acquiring bibliographic information from the bibliography server machine 104, the print data deleted in each of step S1007, step S1012, and step S1013 is not displayed.

As described above, in the hold remote print system of the present exemplary embodiment, the automatic deletion processing for deleting the expired print data is performed only in the document receiving machine where the target print data is stored, while not being performed in any other multifunction peripheral than the document receiving machine. In general, it is assumed that a user transmits print data to a multifunction peripheral to which the user is highly likely to actually provide a print instruction. In this case, there may occur such a situation that the user cannot perform printing at the document receiving machine, if the print data is automatically deleted due to the expiration of a shorter validity period set in other multifunction peripheral than a validity period set in the document receiving machine. Accordingly, the automatic deletion of the print data is prohibited until the validity period set in the document receiving machine expires, so that the above-described situation can be prevented.

Meanwhile, it is assumed that in a case where a user provides a deletion instruction for print data in a document list, the user intends to delete the print data by determining that printing of the print data is unnecessary. For this reason, in such manual deletion, it is desirable to prohibit all the multifunction peripherals within the hold remote print system from printing this print data. Therefore, in the manual deletion, control is performed to delete the target print data regardless of which multifunction peripheral stores this print data, so that printing of this print data cannot be performed from any of the multifunction peripherals from that point on.

Further, when print data is deleted, the deletion of the bibliographic information of this print data is notified to the bibliography server machine, irrespective of whether the deletion is the automatic deletion or the manual deletion. The bibliographic information after this deletion can be thereby shared with the plurality of multifunction peripherals. As a result, this print data is no longer displayed in all of the multifunction peripherals within the system.

There is described above the example in which the expired print data is identified in step S908 in FIG. 9A, and the storage location of the identified print data is determined in step S1005 in FIG. 10, but these steps may be performed in reverse order. In other words, whether the target print data is stored in the own apparatus or other apparatus may be determined based on the bibliographic information, and whether the validity period has expired may be determined only for the print data determined to be stored in the own apparatus.

In the first exemplary embodiment, there is described the example in which the deletion of the print data with the expired validity period and the deletion of the bibliographic information of this print data are performed only in the document receiving machine where the target print data is stored. According to the first exemplary embodiment, the print data is displayed in the document list screen and can be printed, unless the validity period of this print data based on the setting of the document receiving machine expires, even if this print data has a validity period that has expired according to the setting of other multifunction peripheral. Meanwhile, depending on the use of the system, there is a case where it is desirable to prohibit printing of print data whose validity period set in each of the multifunction peripherals has expired. Therefore, in a second exemplary embodiment, there will be described an example in which each of the multifunction peripherals within the system cannot perform printing of print data whose validity period set in the own multifunction peripheral has expired. The second exemplary embodiment is similar to the first exemplary embodiment except that a deletion processing procedure is different from the deletion processing procedure performed in step S909 in FIG. 9A and step S922 in FIG. 9B.

<Deletion Processing Procedure>

Figure 11:
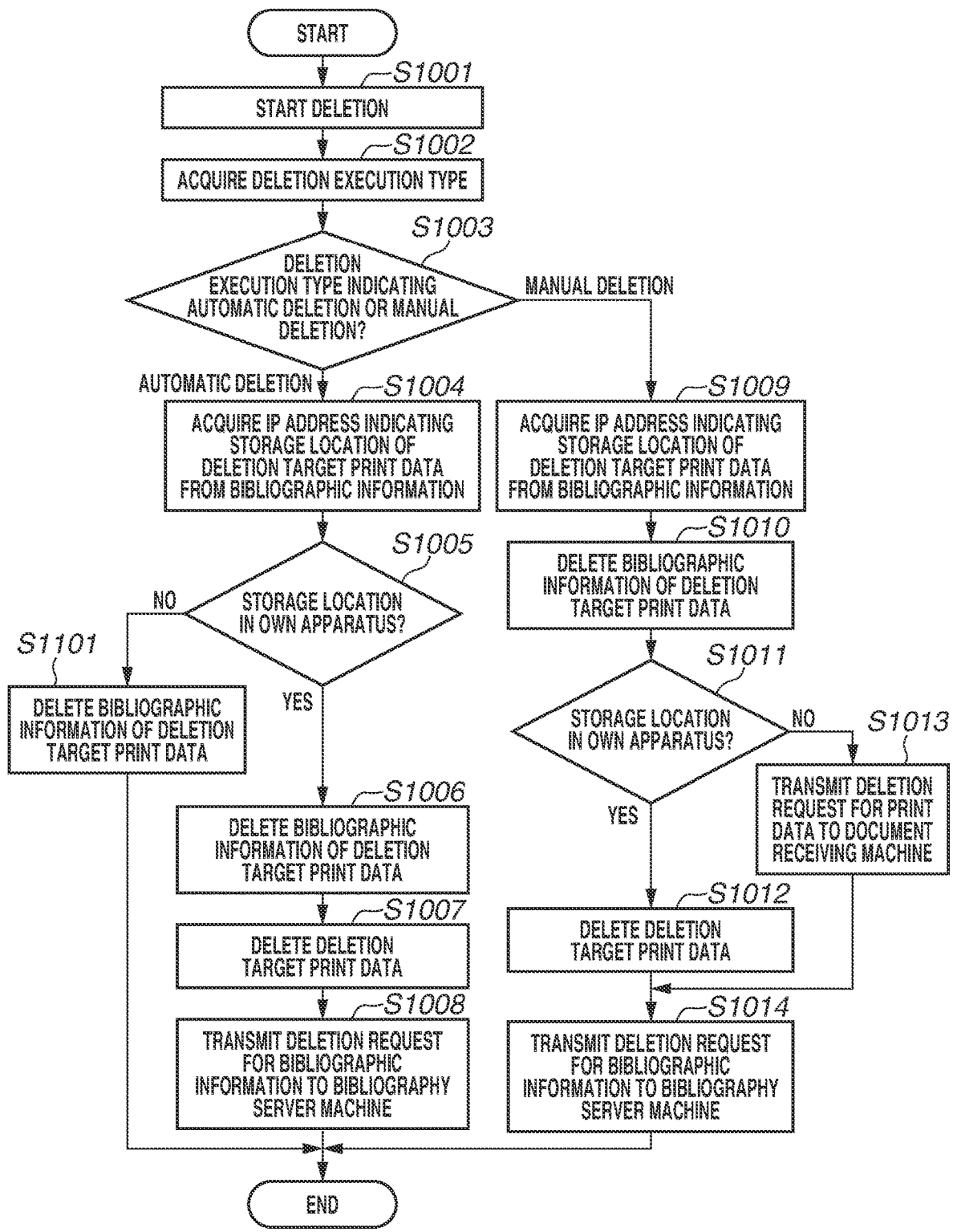
FIG. 11 is a flowchart illustrating an example of a deletion processing procedure of a multifunction peripheral according to one or more aspects of the present disclosure.

FIG. 11 is a flowchart illustrating an example of a deletion processing procedure in each of the multifunction peripherals 103, 104, and 105, according to the second exemplary embodiment. The CPU 201 of each of the multifunction peripherals 103, 104, and 105 executes the deletion processing procedure. FIG. 11 is different from FIG. 10 in that step S1101 is added. Other steps in FIG. 11 are similar to those in FIG. 10 and thus are provided with the same numerals as those in FIG. 10, and the detailed description thereof will be omitted.

If the hold print application 313 determines that the storage location of deletion target print data is in other apparatus (NO in step S1005), the processing proceeds to step S1101. In step S1101, the hold print application 313 deletes the bibliographic information of this print data.

In this way, in the second exemplary embodiment, the bibliographic information is deleted for the print data having the validity period that has expired in the multifunction peripheral other than the document receiving machine, so that this print data is not displayed. Accordingly, printing from this multifunction peripheral can be prevented. Meanwhile, since the print data stored in the document receiving machine is not deleted and the bibliography server machine 104 is not requested to delete the bibliographic information, printing can be performed from other multifunction peripheral having an unexpired validity period. In this way, it is possible to implement a hold remote print system in which a validity period for print data held in any one of multifunction peripherals within the system is set in each of the multifunction peripherals, and printing of this print data can be performed within the validity period and cannot be performed when the validity period expires.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-128440, filed Jul. 5, 2018, which is hereby incorporated by reference herein in its entirety.

What is claimed is:

1. A print system including a plurality of print apparatuses, in which print data stored in any one of the print apparatuses is printable from other one of the print apparatuses, the print apparatuses each comprising:
a memory storing instructions, and
one or more processor executing the instructions to cause the print apparatus to:
receive print data transmitted from an information processing apparatus;
store the received print data in a storage of own apparatus received the print data;
set a retention period of print data stored in the own apparatus;
register bibliographic information of the stored print data in a bibliography server, the bibliographic information at least including specification information for specifying a print apparatus storing the print data, and a reception date/time of the print data;
acquire bibliographic information managed by the bibliography server, the bibliographic information to be acquired including bibliographic information registered in the bibliography server by the other print apparatus;
determine whether print data is stored in the own apparatus based on the specification information included in the acquired bibliographic information;
perform, in a case where print data corresponding to the acquired bibliographic information has been retained longer than the retention period and it is determined that the print data is stored in the storage of the own apparatus, deletion processing of the print data stored in the own apparatus, wherein, in a case where the print data has been retained longer than the retention period and it is determined that the print data is stored in a storage of other print apparatus, a request for deleting the print data stored in the storage of the other print apparatus is not transmitted to the other print apparatus, and wherein the print data stored in the storage of the other print apparatus is to be deleted based on a retention period set in the other print apparatus; and
perform, in a case where a deletion instruction for print data corresponding to the acquired bibliographic information is received from a user and it is determined that the print data is stored in the storage of the own apparatus, deletion processing of the print data stored in the own apparatus, wherein, in a case where a deletion instruction for the print data is received by a user and it is determined that the print data is stored in the storage of the other print apparatus, a request for deleting the print data stored in the storage of the other print apparatus is transmitted to the other print apparatus.

2. The print system according to claim 1, wherein a request for deletion of bibliographic information of print data to be deleted is transmitted to the bibliography server.

3. The print system according to claim 2, wherein bibliographic information of print data to be deleted is deleted based on the acquired bibliographic information.

4. The print system according to claim 3, wherein bibliographic information of print data stored in other print apparatus is deleted, and a request for deletion of the bibliographic information is not transmitted to the bibliography server.

5. The print system according to claim 1,
wherein the bibliographic information is managed for each user by the bibliography server, and
wherein, in response to login of a user, bibliographic information of the user logging in is acquired.

6. The print system according to claim 1, wherein the bibliographic information includes identification information for identifying the print data and print setting of the print data.

7. The print system according to claim 1, wherein determination of deletion based on a reception date/time included in the bibliographic information and the set validity period is performed every predetermined time.

8. The print system according to claim 1, wherein any one of the plurality of print apparatuses included in the print system serves as the bibliography server.

9. A print apparatus comprising:
a memory storing instructions, and
one or more processor executing the instructions to cause the print apparatus to:
receive print data transmitted from an information processing apparatus;
store the received print data in a storage of own apparatus received the print data;
set a retention period of print data stored in the own apparatus;
register bibliographic information of the stored print data in a bibliography server, the bibliographic information at least including specification information for specifying a print apparatus storing the print data, and a reception date/time of the print data;
acquire bibliographic information managed by the bibliography server, the bibliographic information to be acquired including bibliographic information registered in the bibliography server by the other print apparatus;
determine whether print data is stored in the own apparatus based on the specification information included in the acquired bibliographic information;
perform, in a case where print data corresponding to the acquired bibliographic information has been retained longer than the retention period and it is determined that the print data is stored in the storage of the own apparatus, deletion processing of the print data stored in the own apparatus, wherein, in a case where the print data has been retained longer than the retention period and it is determined that the print data is stored in a storage of other print apparatus, to not execute a request for deleting the print data stored in the storage of the other print apparatus is not transmitted to the other print apparatus, and wherein the print data stored in the storage of the other print apparatus is to be deleted based on a retention period set in the other print apparatus; and
perform, in a case where a deletion instruction for print data corresponding to the acquired bibliographic information is received from a user and it is determined that the print data is stored in the storage of the own apparatus, deletion processing of the print data stored in the own apparatus, wherein, in a case where a deletion instruction for the print data is received by a user and it is determined that the print data is stored in the storage of the other print apparatus, a request for deleting the print data stored in the storage of the other print apparatus is transmitted to the other print apparatus.

10. A control method for a print apparatus, the control method comprising:
receiving print data transmitted from an information processing apparatus;
storing the received print data in a storage of own apparatus received the print data;
setting a retention period of print data stored in the own apparatus;
registering bibliographic information of the stored print data in a bibliography server, the bibliographic information at least including specification information for specifying a print apparatus storing the print data, and a reception date/time of the print data;
acquiring bibliographic information managed by the bibliography server, the bibliographic information to be acquired including bibliographic information registered in the bibliography server by the other print apparatus;
determining whether print data is stored in the own apparatus based on the specification information included in the acquired bibliographic information;
performing, in a case where print data corresponding to the acquired bibliographic information has been retained longer than the retention period and it is determined that the print data is stored in the storage of the own apparatus, deletion processing of the print data stored in the own apparatus, wherein, in a case where the print data has been retained longer than the retention period and it is determined that the print data is stored in a storage of other print apparatus, to not execute a request for deleting the print data stored in the storage of the other print apparatus is not transmitted to the other print apparatus, and wherein the print data stored in the storage of the other print apparatus is to be deleted based on a retention period set in the other print apparatus; and
performing, in a case where a deletion instruction for print data corresponding to the acquired bibliographic information is received from a user and it is determined that the print data is stored in the storage of the own apparatus, deletion processing of the print data stored in the own apparatus, wherein, in a case where a deletion instruction for the print data is received by a user and it is determined that the print data is stored in the storage of the other print apparatus, a request for deleting the print data stored in the storage of the other print apparatus is transmitted to the other print apparatus.

11. A non-transitory computer readable storage medium on which is stored a computer program for making a computer execute a control method for a print apparatus, the control method comprising:
receiving print data transmitted from an information processing apparatus;
storing the received print data in a storage of own apparatus received the print data;

setting a retention period of print data stored in the own apparatus;

registering bibliographic information of the stored print data in a bibliography server, the bibliographic information at least including specification information for specifying a print apparatus storing the print data, and a reception date/time of the print data;

acquiring bibliographic information managed by the bibliography server, the bibliographic information to be acquired including bibliographic information registered in the bibliography server by the other print apparatus;

determining whether print data is stored in the own apparatus based on the specification information included in the acquired bibliographic information;

performing, in a case where print data corresponding to the acquired bibliographic information has been retained longer than the retention period and it is determined that the print data is stored in the storage of the own apparatus, deletion processing of the print data stored in the own apparatus, wherein, in a case where the print data has been retained longer than the retention period and it is determined that the print data is stored in a storage of other print apparatus, to not execute a request for deleting the print data stored in the storage of the other print apparatus is not transmitted to the other print apparatus, and wherein the print data stored in the storage of the other print apparatus is to be deleted based on a retention period set in the other print apparatus; and performing, in a case where a deletion instruction for print data corresponding to the acquired bibliographic information is received from a user and it is determined that the print data is stored in the storage of the own apparatus, deletion processing of the print data stored in the own apparatus, wherein, in a case where a deletion instruction for the print data is received by a user and it is determined that the print data is stored in the storage of the other print apparatus, a request for deleting the print data stored in the storage of the other print apparatus is transmitted to the other print apparatus.

* * * * *